United States Patent [19]

Strecker

[11] Patent Number: 5,645,471

[45] Date of Patent: Jul. 8, 1997

[54] METHOD OF TEXTURING A SUBSTRATE USING AN ABRASIVE ARTICLE HAVING MULTIPLE ABRASIVE NATURES

[75] Inventor: Darlene N. Strecker, Oakdale, Minn.

[73] Assignee: Minnesota Mining and Manufacturing Company, St. Paul, Minn.

[21] Appl. No.: 514,491

[22] Filed: Aug. 11, 1995

[51] Int. Cl.$^6$ .................................................. B24B 29/00
[52] U.S. Cl. .............................. 451/59; 451/41; 451/299; 451/307
[58] Field of Search ................................ 457/36, 37, 41, 457/59, 296, 299, 302, 307, 309

[56] References Cited

U.S. PATENT DOCUMENTS

| | | |
|---|---|---|
| 449,930 | 4/1891 | Dubey . |
| 875,936 | 1/1908 | Landis . |
| 4,347,689 | 9/1982 | Hammond ............................. 451/307 |
| 4,644,703 | 2/1987 | Kaczmarek et al. . |
| 4,734,104 | 3/1988 | Broberg . |
| 4,737,163 | 4/1988 | Larkey . |
| 4,930,266 | 6/1990 | Calhoun et al. . |
| 4,951,423 | 8/1990 | Johnson . |
| 5,166,006 | 11/1992 | Lal et al. . |
| 5,167,096 | 12/1992 | Eltoukny et al. ...................... 451/59 |
| 5,307,593 | 5/1994 | Lucker et al. ......................... 451/307 |
| 5,431,592 | 7/1995 | Nakata ................................... 457/307 |

FOREIGN PATENT DOCUMENTS

| | | |
|---|---|---|
| 0 554 668 | 8/1993 | European Pat. Off. . |
| 4-141377 | 5/1992 | Japan . |
| 4-210383 | 7/1992 | Japan . |
| 6-278037 | 10/1994 | Japan . |
| 1787756 | 1/1993 | Russian Federation . |

*Primary Examiner*—Bruce M. Kisliuk
*Assistant Examiner*—Eileen Morgan
*Attorney, Agent, or Firm*—Gary L. Griswold; Walter N. Kirn; Paul W. Busse

[57] ABSTRACT

The present invention relates to a method of texturing a rigid disk for magnetic media applications, using a coated abrasive article comprising a backing having at least two regions of abrasive coating bonded to one side of the backing. The at least two regions of abrasive coating have different abrasive natures.

12 Claims, 2 Drawing Sheets

METHOD OF TEXTURING A SUBSTRATE USING AN ABRASIVE ARTICLE HAVING MULTIPLE ABRASIVE NATURES

FIELD OF THE INVENTION

The present invention relates to a method of texturing a substrate, particularly a rigid disk, using a coated abrasive article comprising a backing having at least two regions of abrasive coating bonded to one side of the backing. The at least two regions of abrasive coating have different abrasive natures.

BACKGROUND OF THE INVENTION

In many abrading or polishing operations, a finer finish is desired on one part of a workpiece than on another part. A conventional method of producing such a final surface is to abrade the entire workpiece surface with a coarse abrasive, leaving a rough finish, after which a fine abrasive is used only on the part of the workpiece requiring the finer finish. An alternate method is to abrade the entire workpiece with a fine abrasive thus imparting a fine finish, and then roughening part of the surface with a coarse abrasive to provide the desired rougher section.

Personal computers, which have become common in the current times, frequently contain a rigid memory disk or hard drive, which involves a rigid thin film metal or nonmetal disk as the substrate for the magnetic medium coating. The annular surface of the thin film disk, which will be coated with magnetic media, requires a coarser finish on the inner portion of the annular surface and a finer finish on the outer portion of the annular surface. In one conventional arrangement, the thin film rigid disks are manufactured by electroless nickel plating a thin-film of nickel or nickel alloy onto an aluminum base, such as nickel/phosphorus (Ni—P), which is then polished to a very fine, mirror-like finish. After polishing, the Ni—P coating is textured, followed by the application of a magnetic coating(s) thereon to form the magnetic medium. Nonmetal substrates, such as glass or ceramic substrates, also are used in the rigid memory disk industry in place of the metal substrates. For these nonmetallic substrates, there is no metal or metal alloy coating applied onto the metal base before subsequent polishing, texturing, and magnetic coating application. Rather, the surface of the glass or ceramic rigid disk itself is polished, textured, and thereafter the magnetic coating is directly applied thereon without interposing any metal or metal alloy coating layer.

Rigid disks require a fairly consistent surface texture in order for the disk to perform properly. The texture provided on the surface of a thin film rigid disk is a compromise of the surface finish (Ra) necessary for the memory area versus the surface finish necessary for the head landing zone. The landing zone, typically a ⅛ inch to ⅜ inch (0.32 to 0.95 cm) wide inner annular portion of the disk, requires a relatively rough finish to minimize the stiction and friction between the disk and the read/write head on startup and shutdown of the drive. The texturing also eases the separation between the computer head and the rigid disk when the computer is first turned on. If the disk is smooth and untextured, it is difficult for the disk to start spinning because of too much head/disk contact. The surface roughness of the landing zone preferably has an Ra of about 40 to 60 Angstroms. In contrast, the memory retention area of the disk, typically the outer annular surface portion of the disk, does not need to be as rough, but is preferred to have an Ra of about 20 Angstroms. A lower Ra minimizes asperities on the disk surface and enables lower flying heights of the read/write head which results in higher recording densities.

The texturing process is critical to the performance of rigid disks. Texturing typically produces, on the annular surface of the disk which will bear the magnetic medium coating, a random pattern of uniform scratches with sharply defined edges in a substantially circumferential direction relative to the center of the rigid disk. Disk texturing accomplishes a number of purposes, including improving the aerodynamics between the computer head (which reads and writes data on the disk) and the surface of the magnetic coating on the disk. The scratches formed during texturing make it easier for the head to distinguish bytes of information between tracks on the disk. If the scratches are too deep, however, this may cause a loss of data on the rigid disk.

Disk surface texturing has traditionally been accomplished by using a loose abrasive slurry. Loose abrasive slurries provide the requisite substantially circumferential scratches that have sharply defined edges with the appropriate depth. The use of loose abrasive slurries is, however, accompanied by a number of disadvantages. For instance, the loose abrasive slurries create a large amount of debris and waste. As a result, the thin film rigid disks must be thoroughly cleaned to remove any residual surface residue from the abrasive slurry. The loose abrasive slurry also results in a relatively high amount of wear on the equipment used for texturing.

To overcome the above noted disadvantages associated with loose abrasive slurries, coated abrasive lapping films have been used to texture the thin film rigid disks. Such a lapping film typically comprises a polymeric film backing having an abrasive layer consisting of very fine abrasive particles dispersed in a binder. The abrasive layer is typically coated on the polymeric film to form a thin layer which has a surface profile which is essentially flat other than the partial protrusions of some of the abrasive particles. During use, the lapping film abrades a portion of the substrate surface to impart the texture therein. Recently the use of porous nonwoven cloths coated on a surface with an abrasive slurry has been advanced as an alternate to lapping film to uniformly texture thin film metal or metal alloy coated rigid disks before application of the magnetic coatings in a clean process that generates high quality scratches and avoids reweld, i.e., the reattachment of abraded metal particles on the surface being textured. For example, U.S. Pat. No. 5,307,593 (Lucker et al.) discloses a nonwoven substrate having an abrasive coating thereon that is used for texturing magnetic media substrates having a thin-film metal or metal alloy coating. The porous nonwoven substrate provides advantages such as the ability to collect and entrap swarf and debris during the abrasion. U.S. Ser. No. 08/301,254 (Wedell et al.) filed 6 Sep. 1994 and assigned to the assignee of the present invention, discloses combining the texturing characteristics of a loose abrasive slurry and a fixed abrasive tape by providing a water soluble abrasive coating on a nonwoven material.

Each of these methods, loose abrasive slurries, film backed lapping films, and nonwoven backed lapping products, requires, at a minimum, a second texturing step in order to produce the difference in surface texture needed on the disk between the memory area and the landing zone.

U.S. Pat. No. 875,936 (Landis) teaches an abrading material comprising a backing coated with relatively wide and narrow parallel abrasive coatings with adjacent strips each containing a different grade of two different abrasive grades and regions between the strips being devoid of any abrasive coating.

JP 4-141377 published 14 May 1992 teaches a roll of abrasive tape for flexible magnetic disks and magnetic tapes, where the abrasive grain size gradually increases from the free end of the tape to the center of the roll. The pressure of being wound counteracts the larger abrasive grain size and thus, when utilized, the abrasive tape has a uniform abrasiveness throughout the length of the tape as it is unwound from the roll.

JP 4-210383 published 31 Jul. 1992 teaches a roll of coated abrasive tape for the polishing of magnetic recording medium, where the hardness of the binder is varied along the length of the tape from the free end to the center of the roll. The pressure of being wound counteracts the binder hardness variance and thus, when utilized, the abrasive tape has a uniform abrasiveness throughout the length of the tape as it is unwound from the roll.

U.S. Pat. No. 5,166,006 (Lal et al.) teaches texturing thin film disks by use of a chemical etchant process.

U.S. Pat. No. 5,167,096 (Eltoukhy et al.) describes a disk-like abrasive pad having a backing comprising regions of different compressibilities which produce a deeper-groove texture opposite a less compressible part of the backing at the inner diameter of a disk.

U.S. Ser. No. 08/398,198 (Ohishi) filed 2 Mar. 1995 and assigned to the assignee of the current invention, teaches a method of texturing thin film rigid disks using an abrasive article comprising abrasive composites.

U.S. Ser. No. 08/514,417 (Stubbs et al.) filed 11 Aug. 1995 and assigned to the assignee of the current invention, teaches a method of making abrasive articles having at least two regions of abrasive coating abutting, wherein the regions having different abrasive natures, and method of making same.

SUMMARY OF THE INVENTION

The present invention relates to a method of texturing substrates, particularly rigid disks for use as magnetic media. In particular, the present invention relates to a method of texturing a surface of a rigid disk to simultaneously impart a first area on said surface having a first surface finish and a second area on said surface having a second surface finish, said method comprising the steps of:

(a) contacting said surface with a coated abrasive article comprising a first region having a first abrasive nature and a second region having a second abrasive nature, both regions bonded to a backing, said first abrasive nature being different than said second abrasive nature; and (b) moving at least one of said coated abrasive article or said rigid disk with respect to each other under conditions to impart said first and second surface finishes.

The abrasive nature of the coating can be altered by using different size abrasive particles, different types of abrasive particles, adding fillers or additives to affect erodability, different binders, different coating patterns, different size or shape of abrasive composites, or varying the density of abrasive composites. The abrasive nature can also be altered by changing the ratio of materials in the abrasive coating, e.g., the binder to abrasive grain ratio, or by the processing conditions, e.g., different coating methods, or different degree of cure. It is also possible in certain applications to create an abrasive coating having no abrasive particles or grit therein, that when fully cured, nonetheless functions as a polishing article depending on the hardness of the workpiece and the abrasiveness of the cured binder relative thereto.

The phrase "abrasive nature" as used herein means or refers to the ability of the abrasive coating to impart a surface finish (e.g., textured or smooth) to a surface of a workpiece. The surface of a workpiece can be altered by the abrasive article in many ways, such as removal of material, reduction or increase of the surface roughness, or imparting a pattern in the topography of the workpiece surface. As used herein, "different abrasive nature" means that the surface of a workpiece has one area having an Ra at least 10%, preferably at least about 20% greater than the Ra of a second area. "Ra" of a surface is defined as the measurement of the arithmetic average of the scratch depth. It is the arithmetic average of five individual roughness depths, where an individual roughness depth is the vertical distance between the highest point and a center, or mean, line.

DETAILED DESCRIPTION OF THE INVENTION

The process of texturing a substrate, in particular a magnetic medium coated rigid disk includes providing a substrate, usually a rigid disk substrate, generally having a thickness between 0.75 to 1.25 millimeter. The rigid disk substrate may be metallic or nonmetallic. The metal rigid disks preferably have a base of aluminum alloy coated with a thin metal or metal alloy coating. The nonmetallic disk substrates are preferably glass or ceramic. The phrase "rigid substrate" as used herein means a thin member comprising a structure composed of a single distinct layer or plurality of integral layers having a surface on which is adherently applied a magnetic layer.

Texturing of Rigid Disks

The general method of texturing thin film rigid disks is well known in the art. Examples include those methods disclosed in U.S. Pat. No. 5,307,593 (Lucker et al.) and U.S. Ser. No. 08/398,198 (Ohishi) filed 2 Mar. 1995, assigned to the assignee of the present invention, and incorporated herein by reference for their teachings of rigid disk texturing.

Figure 2:
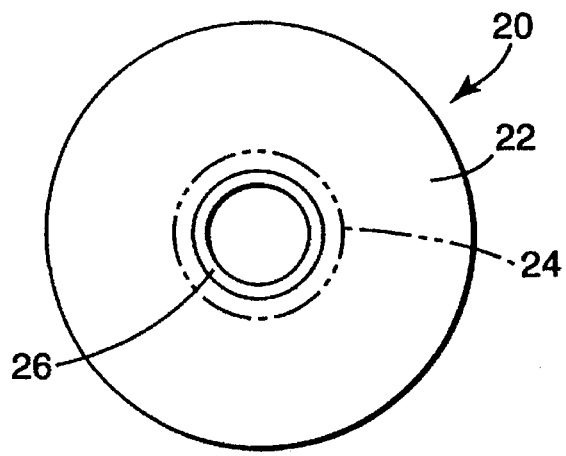
FIG. 2 is a plan view of a thin film rigid disk.

The drawings are provided to facilitate the understanding of the invention. FIG. 2 shows a rigid disk 20 having a surface which includes three areas: a smooth-surfaced memory area 22, a textured surface landing zone 24, and an optionally textured center 26. Disk 20 is the type commonly used in computer hard drives. While the computer is turned off, the read/write head (not shown) of the computer is stationed in landing zone 24. As the computer is powered up and disk 20 begins to spin, the head, while in contact with landing zone 24 slides over landing zone 24, until disk 20 has reached full speed, after which the head moves to memory area 22.

It is preferred that landing zone 24 have a rough surface, on the order of 40 to 60 Angstroms Ra (0.004 to 0.006 micrometers), and that memory area 22 have a surface roughness of about 20 Angstroms Ra (0.002 micrometers).

The width and height of the scratches do not have to be uniform, although the scratches should not be excessively wide or deep.

Figure 3:
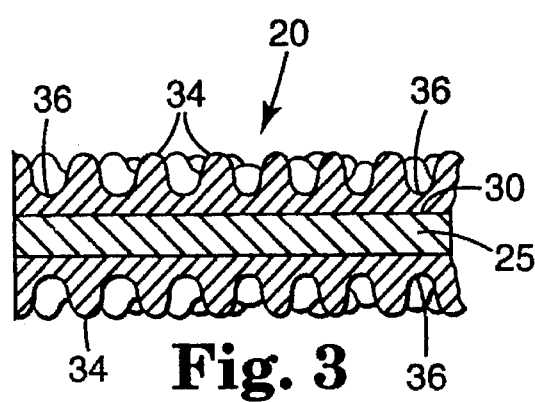
FIG. 3 is a cross section area of a thin film rigid disk.

Referring now to the partial cross-sectional view of FIG. 3, rigid disk 20 comprises metal base 35 with at least metal coating 31 having textured metal surfaces 30 and 32. Scratches on surfaces 30 and 32 are circumferentially deployed about the center of disk 20, irregular in nature and comprise high regions 34 and low regions 36. The texturing process results in an increase in the exposed surface area of the metal coating(s) 31. The rougher surface reduces stiction/friction with a computer head and the substantially circumferential direction of the scratches enables better differentiation between data tracks.

Although the disks shown in FIGS. 2 and 3 are comprised of a metal base coated with a thin metal or metal alloy film, it is to be understood that the present invention also contemplates applying the texturing to other substrates, for example, those made of glass or ceramic material, which may have a metal or metal alloy thin film coating formed on a surface thereof. If the original surface(s) of the substrate is glass or ceramic without a metal coating, the glass or ceramic is directly subjected to the texturing method of the present invention. A glass substrate material can be made of a hard amorphous glass material such as a fused mixture of the silicates of the alkali and alkaline-earth or heavy metals. A ceramic substrate material can comprise various hard materials made by shaping and then firing at a high temperature a nonmetallic mineral such as clay. These ceramic materials include ceramic alloys, such as silicon nitride, silicon carbide, zirconia, alumina, and the like. Carbon and titanium also are known as substrates which can be textured by the method of the present invention.

Figure 4:
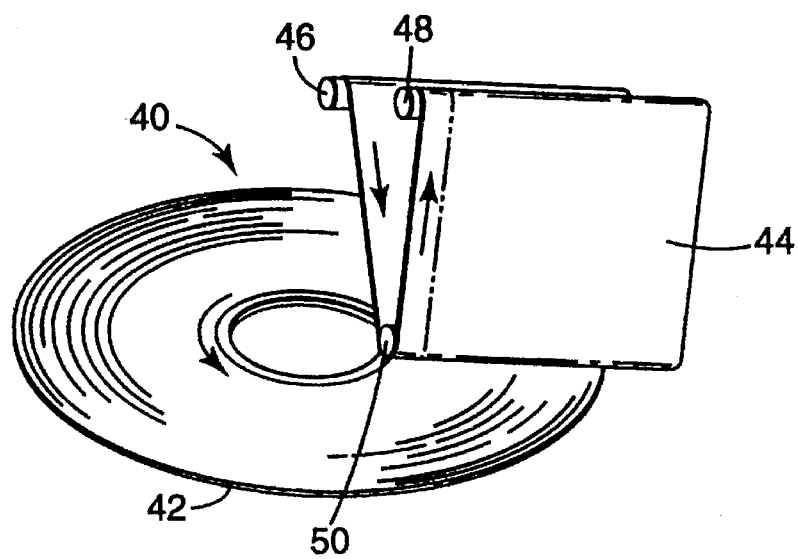
FIG. 4 is a schematic perspective view of the articles which are deployed with respect to one another for practicing a method of the present invention.
Figure 5:
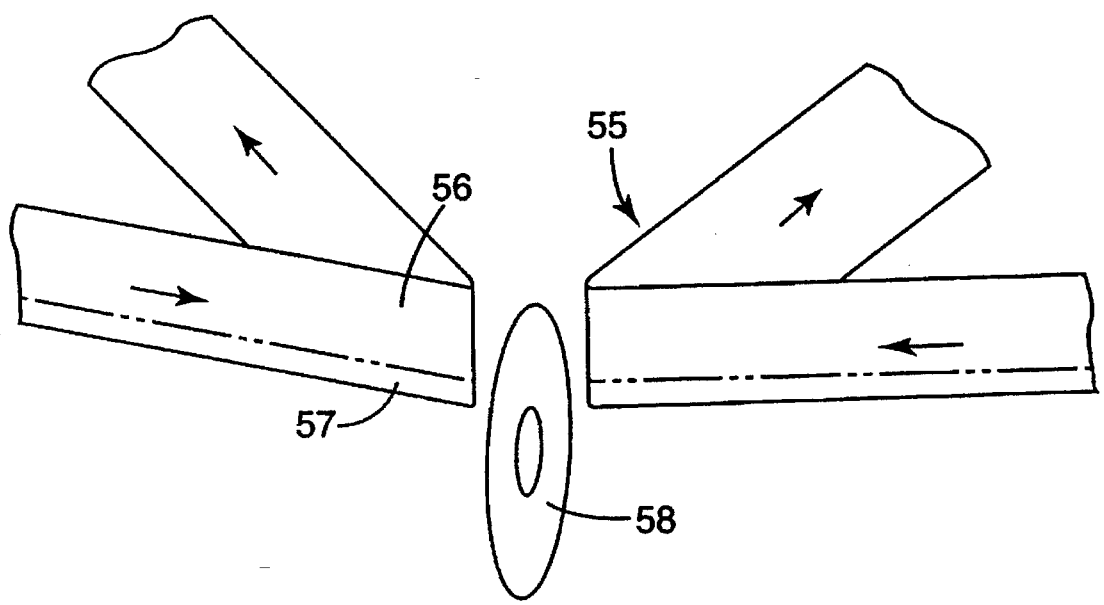
FIG. 5 is a schematic perspective view of other articles alternatively deployed with respect to one another for practicing a method of the present invention.

FIG. 4 depicts a simplified schematic depiction of the deployed articles 40 of the present invention, including a substrate such as rigid disk 42 and abrasive article 44 for use with the method of the present invention. Although the texturing of only one side of the substrate (in FIG. 4, a rigid disk) 42 is depicted, it is understood that both sides of the rigid disk 42 may be textured simultaneously by separate abrasive articles as depicted in FIG. 5 or sequentially or even simultaneously by the same abrasive article. Rigid disk 42 generally has a diameter between 30 to 200 millimeters, typically between 40 to 150 mm, and more typically between 48 and 130 mm. Rigid disk 42 is installed on a machine (not shown) for texturing rigid disks, for example, that available under the trade designation "HDF" from the Exclusive Design Company (San Mateo, Calif.). The machine spins rigid disk 42 between about 50 to 700 rpm, resulting in a direction of travel with a surface speed on disk 42 of between about 7.5 to about 440 meters/minute, measured at the outer edge of the disk. The abrasive article 44 of the invention is preferably in the form of an elongate ribbon or tape of coated abrasive having areas of different abrasive natures, as described above, provided in a roll form having a width between 20 to 60 millimeters, preferably between 25 to 50 mm. The continuous strip of the abrasive article 44 is unwound from the roll at a first station 46 and is rewound once used at a second station 48. An unwound portion of the coated abrasive strip between station 46 and station 48 is caused to contact the surface of metal coating on disk 42 while being engaged against the surface being finished by roller 50 as disk 42 rotates. Roller 50 has a preferred diameter of about 50 mm and is preferably constructed of an elastomeric material having a Shore A durometer of about 50. The force between the abrasive article 44 and the metal coating on disk 42 is between 0.1 to 4 kg, preferably between 0.5 and 3 kg, for a contact length of 3.1 mm using a rubber roll having a diameter of 50 mm and a Shore A hardness value of 50. If the pressure is too high, the resulting surface finish, Ra, will be undesirably high, i.e., greater than about 7 nanometers (0.0070 micrometers). If the pressure is too low, then the scratch height will be undesirably low and the surface finish will be undesirably low, i.e., less than about 2 nanometers (0.0020 micrometers). The pressure needed to provide the desired scratch height is dependent on, for example, the speed of the abrasive article, disk speed, disk material, and rubber roll hardness.

The preferred method of texturing includes oscillating roller 50 in a radial direction relative to the rotation (or travel direction) of disk 42 during the texturing process. The radial oscillation ensures that the scratches formed by the abrasive article 44 are not concentric on the substrate 42, but are, instead, substantially circumferential with random crossings. During texturing, the abrasive strip 44 is also indexed at a controlled rate between stations 46 and 48 to periodically provide fresh abrasive. The indexing speed of the abrasive article 44 is between 50 to 400 mm/minute, preferably between 150 to 250 mm/min. The combination of the indexing the strip of abrasive article 44 and the oscillating roller 50 provides the random, substantially circumferentially spaced scratches desired.

The finished surface of rigid disk 42 is typically cleaned after texturing to remove any debris or swarf. After cleaning, any conventional magnetic coating can be applied over the scratches. A typical magnetic media coating, such as chrome, is applied over the textured metal, e.g., nickel/phosphorus, or nonmetallic coating. An additional coating of a magnetic material can be applied over the chrome coating, for example, a CoXZ alloy, where Co is cobalt, X can be platinum or tantalum, and Z can be chrome or nickel. Finally a carbon coating can be applied over the magnetic coating. This coating technique is within the knowledge of one skilled in the rigid magnetic disk manufacturing field.

FIG. 5 is another simplified schematic representation of the method of the present invention. Abrasive articles 55 are used to texture the surfaces of rigid disk 58. Abrasive articles 55 each have regions 56 which have a less abrasive nature than regions 57. Abrasive articles 55 are incrementally indexed in the direction denoted by the arrows to provide fresh abrasive to the surface of the rigid disk being textured.

The abrasive article used in the method of the present invention comprises an abrasive coating having at least two regions, the two regions having different abrasive natures. The abrasive nature of the coating can be altered by using different sizes and/or different types of abrasive particles, different binders, adding fillers or additives to affect erodability or cut rate, varying the ratio of binder to fillers and/or abrasive particles, or overall lack of abrasive coating. The phrase "abrasive particles", as used herein, means abrasive grains, abrasive agglomerates, and abrasive composites. When agglomerates and/or composites are used, the density may be varied to alter the abrasive nature.

Abrasive Articles

In a coated abrasive article, a binder bonds abrasive particles to a backing. A typical method for making a coated abrasive article is to provide a backing, apply a resinous organic make coat on the backing, apply abrasive particles by a known technique (e.g., electrostatic, magnetic, or drop coating) onto and into the make coat, at least partially cure the make coat, apply a resinous size coat over the abrasive particles, cure, and optionally apply a resinous supersize coat over the size coat. The curing can be done by exposing the abrasive article to an energy source such as thermal or radiation energy. The details of this typical and exemplary process are well known in the art. It has been found that before applying any additional coating, it is preferred that any resinous layers already existing on the article be sufficiently cured in order to maintain the article's integrity during the application of an additional coating layer.

The backing may be treated prior to application of the make coat with a backing treatment, such as a primer, presize, backsize, and/or saturant. The backing treatment can be applied by any conventional technique such as dip coating or roll coating, and is at least partially cured or dried before the next coat is applied. Preferably, the treatment is fully cured. After the last coat is applied and at least partially cured, if necessary, the remaining partially cured coats are fully cured. After any backing treatment is applied, the make coat precursor is applied over the backing and any optional presize by any conventional technique such as spray coating, roll coating, die coating, powder coating, hot melt coating or knife coating. Abrasive particles are projected into the make coat precursor, typically by an electrostatic coating process, after which the make coat precursor is partially cured. A size coat precursor is then applied over the abrasive particles and make coat by any conventional technique and at least partially cured. A supersize coat precursor can be applied over the size coat. Finally, the coated abrasive is subsequently further cured, humidified, or flexed, if so desired.

Figure 1:
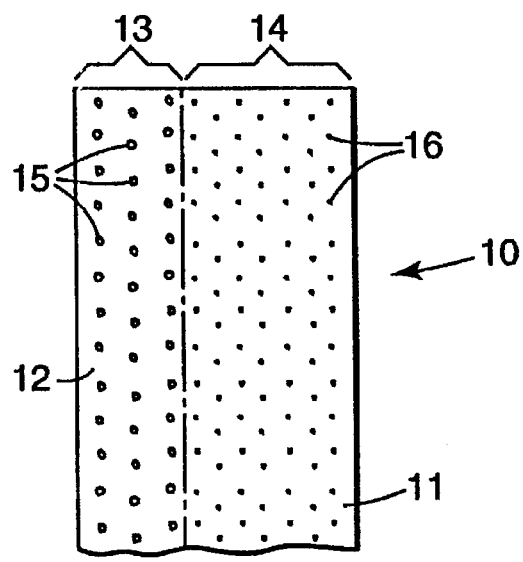
FIG. 1 is a plan view of one abrasive article useful in an embodiment of the present invention.

FIG. 1 shows abrasive article 10 having backing 11 on which is abrasive coating 12. Abrasive coating 12 comprises two regions, region one 13 and region two 14, each of which comprise a binder (not depicted) and a plurality of abrasive particles. Region one 13 comprises first abrasive particles 15 and region two 14 comprises second abrasive particles 16. First abrasive particles 15 have an average particle size discernibly greater than the average particle size of second abrasive particles 16. In this example, the abrasive nature of the coating differs by the average particle size of the abrasive particles. In this example, the average particle size of the abrasive particles of one coating region differ by at least about 10%, preferably by at least about 25%, and more preferably by at least about 50% from the average particle size of the abrasive particle of the second coating region.

In order to produce the abrasive article for the practice of the method of the present invention, at least two regions each having a different abrasive nature are provided in the abrasive article by side-by-side contiguous abrasive coating regions. It is preferred that the regions have boundaries that directly adjoin one another, so that there is no area therebetween that is devoid of abrasive coating, although a minimal gap may be tolerated. An acceptable gap is typically less than 1 millimeter, preferably less than 0.5 mm, and more preferably less than about 0.1 mm in width. It is preferred that the gap between the at least two regions be minimal because the surface finish of the substrate textured by that gap may be unpredictable. The coating regions can either be applied sequentially or simultaneously, but it should be done in such a way as to minimize overlap of adjacent abrasive areas. It is possible to have some intermixing at a common boundary between adjacent regions, but this is usually not preferred because the surface finish produced by that area may be unpredictable. It is also possible to have more than two, such as three or four, different abrasive areas side by side, each with different abrasive nature regions, depending on the intended use of the abrasive article. For three or more different regions, the arrangement of the regions can be in any particular order (i.e., increasing or decreasing in abrasive nature), depending on the surface finish desired on the substrate.

The abrasive nature of the regions should be discernibly different, to the extent that the desired surface finish is produced by each region. The phrase "discernibly different", as used herein, means that the abrasive nature from one region provides a surface finish on the textured substrate which is statistically different than the surface finish provided by the other region. The surface finish (e.g., Ra) of a textured rigid disk can be measured, for example, with an interferometer, such as available from WYKO Corp., Tucson, Ariz., using a 40X objective.

The abrasive nature of the coating can be altered depending on the requirements of the disk to be textured, for example, by using different sizes and/or different types of abrasive particles, adding fillers or additives to affect erodability or cut rate, selecting binder systems, or having a lack of abrasive coating. For example, one region can comprise aluminum oxide abrasive particles having an average particle size of 3 micrometers, and a second region can comprise silicon carbide abrasive particles having an average particle size of 2 micrometers. In an alternate embodiment, one region can have a binder to mineral ratio of 1 to 1, and a second region can have a binder to mineral ratio of 1 to 4.

In addition, steps can be taken during the converting process to alter the abrasive nature, steps such as calendering, flexing, or humidifying. It is not necessary that the two regions be formed in situ, but can be laminated together at a later time or coated sequentially.

Another method of producing a coated abrasive, known as a slurry coated abrasive, is to provide a slurry of binder precursor and abrasive particles on a backing. The abrasive particles, and any fillers (including additives, dyes, surfactants, etc.) and possible solvents are mixed into a binder precursor to form a homogenous slurry. Slurries can be coated on a backing by a variety of methods, including gravure roll coating, curtain coating, die coating, and knife coating. A preferred method of producing a slurry coated abrasive article of the present invention is to knife coat the individual slurries simultaneously, such as taught by Stubbs et al. in U.S. Ser. No. 08/514,417 filed 11 Aug. 1995 and incorporated herein by reference. The preferred methods to change the abrasive nature of a slurry coated abrasive include altering the abrasive particle shape or size or type, the amount of solvents or fillers in the slurry or the binder precursor, or calendering one portion of the abrasive article.

Further, another coated abrasive useful in the method of the present invention is a structured abrasive, as taught by U.S. Pat. Nos. 5,152,917 and 5,304,223 (Pieper et al.) and U.S. Ser. No. 08/175,694 (Spurgeon et al.) filed 30 Dec. 1993, now allowed, all incorporated herein by reference. In a structured abrasive article, the abrasive coating is in the form of a plurality of abrasive composites comprising abrasive particles and a binder bonded to a backing. It is generally preferred that each abrasive composite has a precise shape associated with it. The precise shape is determined by distinct and discernible boundaries. These boundaries form the outline or contour of the precise shape, and to some degree separate one abrasive composite from another. The composites are usually formed by filling cavities in a tool with an abrasive slurry comprising abrasive particles and binder precursor, and then curing the binder precursor while in the tool, such that the cured composite has the inverse shape of the cavity. For the abrasive article for use with the present method, the abrasive nature of the abrasive article can be varied by altering the topography (i.e., height, dimension, shape) of the composites, or by the abrasive particles within the composites. Additional details on structured abrasive articles with multiple abrasive natures can be found in U.S. Ser. No. 08/514,417 (Stubbs et al.) filed 11 Aug. 1995, and incorporated herein by reference.

The abrasive article of the method of the present invention is generally in the form of a tape having a width of between about 2.5 cm (1 inch) to about 25 cm (10 inches) and an extended length, usually at least about 25 cm (10 inches), generally at least about 100 cm (39 inches), and typically about 180 meters (600 feet). The exact width and length will depend on the substrate textured and the requirements of any machine being used for the texturing process. In addition, the abrasive article could be in the form of a sheet, disc, or endless belt, depending again on the substrate and on any machine being used.

Abrasive Particles

The abrasive particles used in the method of the present invention typically have an average particle size ranging from about 0.01 to 30 micrometers, usually between about 0.05 to 10 micrometers, and preferably between 0.1 to 5 micrometers, particularly 1, 2, and 3 micrometer average particle size. It is preferred that the abrasive particles have a Mohs' hardness of at least about 8, more preferably above 9. Examples of abrasive particles include fused aluminum oxide (which includes brown aluminum oxide, heat treated aluminum oxide, and white aluminum oxide), ceramic aluminum oxide, silicon carbide including green silicon carbide, chromia, alumina zirconia, diamond, iron oxide, titanium diboride, boron carbide, ceria, cubic boron nitride, boron carbide, garnet, and combinations thereof. Aluminum oxide is the preferred material for metal coated substrates, whereas diamond is preferred for glass or ceramic substrates.

The abrasive particle can be irregular or precisely shaped. Shaped abrasive particles, include for example, thin bodies having geometrical faces of triangle, squares, or the like, three-dimensional shapes such as pyramids, truncated pyramids, prisms, and filamentary or rod shapes. Examples of shaped abrasive particles are taught in U.S. Pat. Nos. 5,090,968 (Pellow); 5,201,916 (Berg et al.); and 5,304,331 (Leonard et al.), and co-pending U.S. Ser. No. 08/085,638 (Holmes et al.) filed 30 Jun. 1993, all incorporated herein by reference.

It is within the scope of the invention to have one region of the abrasive coating having one abrasive particle type, such as fused aluminum oxide, and another region having a different abrasive particle, such as agglomerates or ceramic aluminum oxide. As stated above, the term "abrasive particles" encompasses single abrasive particles and abrasive agglomerates. Abrasive agglomerates are further described in U.S. Pat. Nos. 4,311,489 (Kressner); 4,652,275 (Bloecher et al.); and 4,799,939 (Bloecher et al.), all incorporated herein after by reference.

The abrasive particles can have a surface coating which may increase adhesion to the binder, alter the abrading characteristics of the abrasive particle and the like. Examples of surface coatings include coupling agents, halide salts, metal oxides including silica, refractory metal nitrides, refractory metal carbides and the like.

Binders

Binders for use in the present invention can be any binder conventionally known for abrasive articles. The binders can be thermosetting or thermoplastic. They can be thermal or radiation curable. Preferred binders includes phenolic resin, epoxies, polyesters, polyurethanes, and urea-formaldehyde resins. The same binder can be used for the at least two abrasive regions, or the binder may differ, and thus provide a different abrasive nature.

Typically, the ratio of binder to abrasive particles is usually between about 5:1 to 1:10, more typically 2:1 to 1:5, although higher and lower ratios are also usable. Altering the binder to abrasive particles ratio changes the abrasive nature of the abrasive coating.

Fillers

Fillers, when added to an abrasive coating, are known to affect the abrading characteristics of the coating. Examples of fillers known particularly for the effect on erodability include, but are not limited to, alumina bubbles, polymer spheres, clay bubbles, gypsum, coral, coquina, and oolite. Other examples of useful fillers for this invention include: metal carbonates (such as calcium carbonate (chalk, calcite, marl, travertine, marble, and limestone), calcium magnesium carbonate, sodium carbonate, magnesium carbonate), silica (such as quartz, glass beads, glass bubbles, and glass fibers), silicates (such as talc, clays (montmorillonite), feldspar, mica, calcium silicate, calcium metasilicate, sodium aluminosilicate, and sodium silicate), metal sulfates (such as calcium sulfate, barium sulfate, sodium sulfate, aluminum sodium sulfate, and aluminum sulfate), gypsum, vermiculite, wood flour, aluminum trihydrate, carbon black, metal oxides (such as calcium oxide (lime), aluminum oxide, and titanium dioxide), and metal sulfites (such as calcium sulfite). Fillers also include antistatic agents such as carbon black, graphite, vanadium oxide, and humectants.

The term "filler" also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron, and titanium. Other miscellaneous grinding aids include sulfur, organic sulfur compounds, graphite, and metallic sulfides.

The coating may further include additives such as dyes, pigments, lubricants, plasticizers, coupling agents, surfactants, wetting agents, antistatic agents, and the like.

Backing

Examples of typical abrasive backings include polymeric film (including primed polymeric film), cloth (including greige cloth), paper, vulcanized fiber, thermoplastics, nonwovens, metal (including metal substrates, metal foils, and the like), and treated versions thereof, and combinations thereof. Primed polymeric film and nonwoven materials are preferred backings.

Objects and advantages of this invention are further illustrated by the following examples, but the particular materials and amounts thereof recited in these examples, as well as other conditions and details, should not be construed to unduly limit this invention.

EXAMPLES

The following non-limiting examples will further illustrate the invention. All parts and percentages are by weight unless otherwise indicated. The following abbreviations are used throughout:

| | |
|---|---|
| SCA2 | silane coupling agent, gamma-glycidoxypropyl trimethoxysilane, commercially available from Union Carbide under the trade designation "A-187"; |
| WAO | white aluminum oxide, |
| MEK | methyl ethyl ketone; |
| TOL | toluene; |
| PR3 | polyester resin, commercially available from Shell Chemical Co. under the trade designation "3300"; |
| SDS | sodium diamylsulfosuccinate, commercially available from American Cyanamid under the trade designation "Aerosol AY100"; |
| POL | polyol, commercially available from Monsanto under the trade designation "RJ100"; |
| TDI | polyisocyanurate of toluene diisocyanate commercially available from Miles under the trade designation "Desmodur IL"; |
| CAT | dibutyl tin dialaurate commercially available from Cardinal Chemical Co. under the trade designation "D-22". |

Texturing Procedure

For the Texturing Procedure, a model 800C HDF Disk Burnisher, manufactured by Exclusive Design Co., San Mateo, Calif., was used. The thin film disk substrate was a nickel/phosphorus (NiP) plated aluminum disk (95 mm diameter) rotated at 200 rpm. The abrasive article of the present invention was cut into the width as described for each Example, having an extended length. Rolls of the abrasive strip were installed on a tape cassette that had a supply reel with the unused abrasive article and a take-up reel with the used abrasive article. Two sets of abrasive tape cassettes were tested. One cassette was used to texture the top surface of the rigid disk, and the other cassette was used to texture the bottom surface of the rigid disk. The feed rate of the abrasive tape was 30.5 cm/min. During the texturing process an aqueous coolant mist was dripped onto a cleaning fabric which was applied to the surface of the rigid disk to transfer the aqueous coolant to the surface of the disk. The aqueous coolant consisted of a 5% by weight solution of RECOOL 85, commercially available from Mangill Chemical Co. Two cleaning tape cassettes (Type TJ Cleaning Tape, manufacture by Thomas E. West Co.) were also used in this test. One cassette was used to clean the top surface of the rigid disk, and the other was used to clean the bottom surface of the rigid disk. At the surfaces of the rigid disk, the abrasive tapes and cleaning tapes were passed over a Shore A50 durometer elastomer roller having a diameter of 50 mm which was not oscillated. The force between the roller and abrasive to the disk was about 8.8 kg. The endpoint of the test was 20 seconds. The surface of the textured rigid disk was then measured using a WYKO interferometer using a 40X objective to determine the surface properties, Ra, of each sample.

Comparative Example A was a conventional 2 micrometer aluminum oxide lapping film on 51 micrometer thick polyester terephthalate backing, commercially available from 3M Company, St. Paul, Minn., under the trade designation "TR3 IMPERIAL Lapping Film".

For Example 1, a commercially available 2 micrometer aluminum oxide abrasive ("2μ 281Q W/D Production Polishing Paper" from 3M) was slit to 0.635 cm width and laminated to a 25 micrometer thick polyester teraphthalate film directly along side a 3.49 cm wide strip of commercially available 1 micrometer aluminum oxide abrasive ("1μ 281Q W/D Production Polishing Paper" from 3M).

For Example 2, a 0.635 cm wide strip of commercially available 2 micrometer aluminum oxide abrasive ("2μ 281Q W/D Production Polishing Paper" from 3M) was laminated to a 5 cm wide strip of 178 micrometer thick nonwoven backing (commercially available from Hollingsworth & Vose). Thus, 4.365 cm of the width of the strip had no abrasive coating thereon.

For Example 3, a 3.49 cm wide strip of the material of Comparative Example A was used. A portion of this strip, 2.86 cm, was calendered in order that 2.86 cm of this had a less aggressive nature than the remaining 0.63 cm wide uncalendered portion.

Table 1 below reports the Ra of Examples 1 through 3 compared to Comparative Example A when tested according to the Texturing Procedure. For all Examples, the more aggressive portion of the Example was placed at the inner diameter of the disk to be textured. Surface roughness was checked at 9 millimeters (landing zone) and 15 millimeters (memory area) from the inner lip of the textured disk, and is reported in Angstroms.

TABLE 1

| Example | Landing Zone Ra | Memory Zone Ra |
|---|---|---|
| Comparative A | 32.8 | 31.8 |
| 1 | 29.6 | 27.3 |
| 2 | 32.0 | 19.7 |
| 3 | 32.6 | 29.0 |

Examples 4 through 6 were produced according to the Procedure for Making a Lapping Abrasive Article. Two abrasive slurries, A (for the landing zone) and B (for the memory zone), were mixed by the following procedure. 120.7 parts 50/50 MEK/TOL; 47.5 parts PR3; 5.2 parts SCA2; 1.6 parts SDS; and 200.0 parts WAO were combined in an alumina ball mill (with glass milling media) and milled for 16 hours. To this was added 46.9 parts MEK/TOL; 117.6 parts PR3; 11.6 parts POL; 22.9 parts TDI; and 0.69 part CAT. Abrasive slurry A had a WAO average abrasive particle size of 3 micrometers, and abrasive slurry B had a WAO average abrasive particle size of 2 micrometers. The abrasive slurries A and B were coated side by side to provide abrasive regions A and B on three different backing to provide Examples 4, 5, and 6 by the following method.

The abrasive slurries were coated onto the backing with a knife coater having a 51 micrometer gap between the knife and the backing. A dividing dam having two compartments was placed behind (upweb) from and in contact with the knife, and the abrasive slurries were poured into the compartments of the dam. The abrasive slurries were physically separated by the dam until they came into contact with the knife. The backing was pulled in the machine direction and the abrasive slurries passed under the knife and abrasive precursor coatings were formed. The abrasive precursor coatings, were then cured in a conventional oven at 121° C.

(250° F.) for 5 minutes followed by 16 hours at 49° C. (120° F.) to form abrasive coatings. The width of abrasive region A was 0.635 cm (0.25 inch) and the width of abrasive region B was 2.84 cm (1.12 inch).

Example 4 was coated on a 51 micrometer thick polyester backing; Example 5 was coated on a 120 micrometer thick paper backing; Example 6 was coated on a 178 micrometer thick nonwoven backing (commercially available from Hollingsworth & Vose).

Examples 4 through 6 were tested on rigid disks according to the Texturing Procedure and the results are shown in Table 2. All Ra results are listed in Angstroms.

TABLE 2

| Example | Landing Zone Ra | Memory Zone Zone Ra |
| --- | --- | --- |
| 4 | 30.7 | 20.8 |
| 5 | 24.1 | 19.6 |
| 6 | 39.6 | 32.3 |

Tables 1 and 2 above show the surface texture of a thin film disk after a single texturing step using a single abrasive article. Until the abrasive article of this invention, at least two separate abrasive articles were needed to provide the difference in Ra from the landing zone area of the disk to the memory area.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of texturing a surface of a rigid disk to simultaneously impart a first area on said surface having a first surface finish and a second area on said surface having a second surface finish, said method comprising the steps of:

(a) contacting said surface with a coated abrasive article comprising a first region having a first abrasive nature and a second region having a second abrasive nature, both regions bonded to a backing, said first abrasive nature being different than said second abrasive nature; and (b) moving at least one of said coated abrasive article or said rigid disk with respect to each other under conditions to impart said first and second surface finishes.

2. A method according to claim 1, wherein said rigid disk is a metal coated rigid disk.

3. A method according to claim 1, wherein said rigid disk is glass or ceramic rigid disk.

4. A method according to claim 1, wherein said first region has an average abrasive particle size at least 10% larger than said second region.

5. A method according to claim 4, wherein said first region has an average abrasive particle size at least 25% larger than said second region.

6. A method according to claim 1, wherein said coated abrasive article is a tape having an extended length.

7. A method according to claim 6, wherein said first region and said second region are parallel along said length.

8. A method according to claim 1, wherein said contacting is accomplished in a liquid environment.

9. A method according to claim 1, wherein said moving comprises spinning said rigid disk to provide a direction of travel while said coated abrasive article is perpendicular to said direction of travel.

10. A method according to claim 9, wherein said moving further comprises oscillating said coated abrasive article perpendicular to said direction of travel.

11. A method according to claim 9, wherein said contacting imparts circumferential scratches in said surface.

12. A method according to claim 11, wherein said circumferential scratches have an Ra between about 20 and 60 Angstroms.

* * * * *